Aug. 11, 1959  S. DALE  2,899,310
BEVERAGE CHARGE HOLDER
Original Filed Jan. 23, 1952
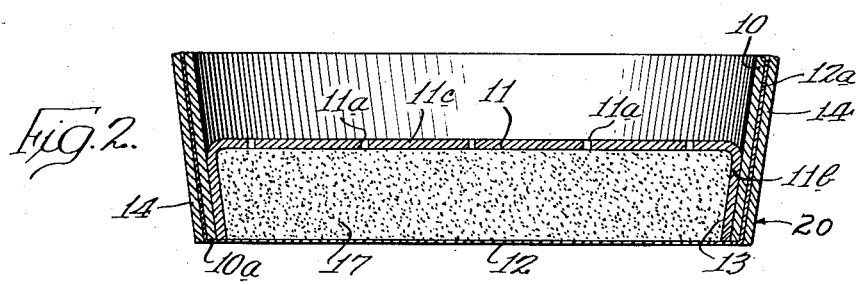
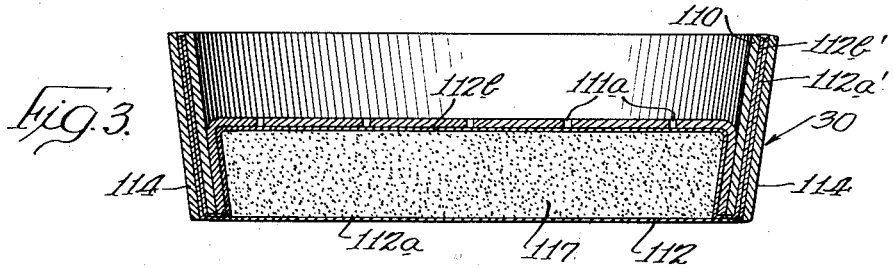
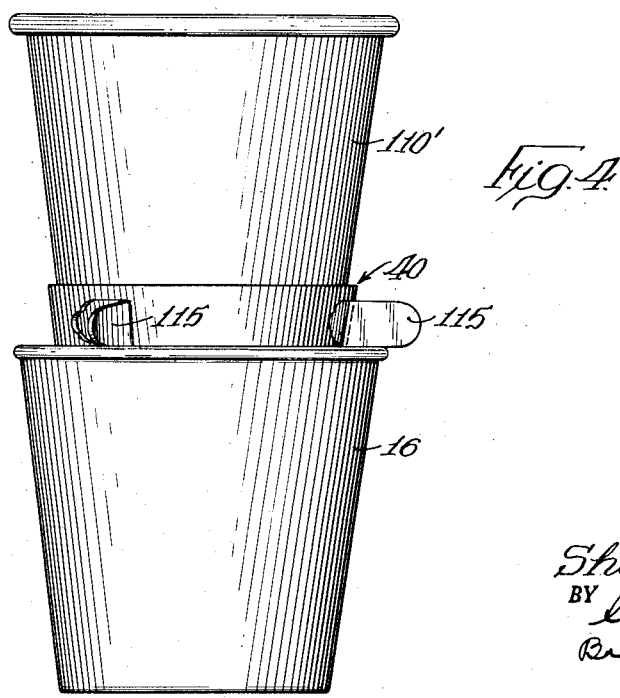
INVENTOR.
Sheldon Dale
BY *Schauler, Hofgren,*
*Brady & Wegner*
Attys.

United States Patent Office 2,899,310
Patented Aug. 11, 1959

2,899,310

BEVERAGE CHARGE HOLDER

Sheldon Dale, Chicago, Ill., assignor to Cory Corporation, a corporation of Delaware Original application January 23, 1952, Serial No. 267,809, now Patent No. 2,743,664, dated May 1, 1956. Divided and this application September 8, 1955, Serial No. 533,201

3 Claims. (Cl. 99—77.1)

This invention relates to a beverage charge holder and in particular to a charge holder which is disposable in its entirety.

This application is a division of my co-pending application Serial No. 267,809, now issued as United States Patent No. 2,743,664.

A well known form of disposable beverage charge holder is the tea bag wherein the charge is retained within a container formed of liquid permeable material such as filter paper. With such a charge holder the brewing is accomplished by submerging the entire charge and holder in the heated liquid which commonly is water.

While such means for preparing a beverage have found wide commercial usage, the non-rigid, non-fixed shape of the tea bag prevents the use thereof when the charge is suspended in juxtaposition to a receptacle and liquid is passed through the charge to effect the beverage preparation. The flexible, yielding nature of the tea bag structure precludes its proper support in this method of beverage preparation and makes its use impractical in devices such as automatic drink machines.

The principal object of this invention is to provide a new and improved disposable charge holder which is usable in the method of preparing a beverage involving the passage of the liquid through a charge.

Another object is to provide such a charge holder which may be readily assembled with the charge therein and which may be disposed of as an integral unit upon completion of the brewing operation.

A further object of the invention is to provide such a beverage charge holder which is permanently assembled to allow unitary use thereof for the preparation of a limited quantity of the desired beverage.

A still further object is to provide a disposable charge holder having a rigid annular support to which is permanently secured means for retaining the charge while allowing transmission of liquid therethrough and the filtering of the resultant beverage.

A still further object is to provide such a disposable charge holder with enclosure means for inclosing the charge which may be secured permanently to the support structure.

Other features and advantages of the invention will be apparent from the following description taken in connection with the accompanying drawings wherein:

Figure 1 is an elevational view of a beverage charge holder embodying the invention;

Figure 2 is a diametrical sectional view thereof;

Figure 3 is a diametrical sectional view of a modified form of a beverage charge holder embodying the invention; and Figure 4 is an elevational view of another form of the beverage charge holder.

In the exemplary embodiment of the invention as disclosed in Figs. 1 and 2 of the drawings, a disposable beverage charge holder 20 is seen to comprise an annular support 10 to which is permanently secured a transversely extending strainer plate 11 and a filter sheet 12 forming a charge holding space 13. To secure filter sheet 12 to support 10 an annular band 14 is provided which in turn is provided with suitable means such as tabs 15 for supporting the charge holder on a receptacle 16. In the use of holder 20, liquid, such as heated water, may be passed downwardly through strainer plate 11, through a charge 17 retained in space 13 where the brewing action may occur, and through filter sheet 12 downwardly into the receptacle 16. Because of the disposable construction of the charge holder, upon completion of the brewing operation the entire holder and spent charge contained therein may be thrown away in the same manner as in the disposition of a tea bag.

Each of the components of my charge holder is formed of disposable material. For purposes of describing this invention I define "disposable" as conforming to the economic requirement of allowing the disposal of the charge holder as a satisfactory commercial practice. This definition excludes any material or construction of the components wherein reuse of the structure is a desideratum. Examples of materials included in the concept of disposable are paper, cloth, and plastics.

While, for purposes of illustrating the invention, I refer to the charge 17 as being coffee grounds it should be understood that any other beverage producing charge such as tea, powdered, crystallized or frozen fruit juices, drink flavoring, milk, etc. could be used. Thus the beverage produced may be a heated or cold one, with the charge holder functioning similarly in all cases.

Annular support member 10 illustratively may be formed of a treated paper which will retain liquid for an adequate period of time. Member 10 is preferably made relatively rigid to form the means for attachment of plate 11 and filter 12 and may extend axially a substantial distance to effect a guiding action on liquid to direct it toward the upper surface of plate 11. To assist in this guiding action support 10 may have a frusto-conical shape, widening upwardly.

Plate 11 may be formed of a material similar to that of which support 10 is formed and comprises a disk-shaped member made foraminous by the inclusion of a plurality of holes 11a. These holes preferably are made small in diameter to preclude loss therethrough of the particulate material comprising the charge 17, thus allowing plate 11 to act as a charge retaining means. A peripheral depending annular flange 11b is provided on plate 11 which is permanently and sealingly secured to the inside of support 10 so as to space the transverse portion 11c of the plate upwardly from the bottom edge 10a of support 10. Flange 11b further cooperates with support 10 to provide the desired rigidity of the charge holder, thus permitting each of these elements to be formed of relatively thin and inexpensive material.

Filter sheet 12 is preferably formed of a filter material such as that used in tea bags and is arranged to extend transversely across support edge 10a. Peripheral edges 12a overlap support edge 10a sufficiently to allow their extension upwardly along the outer surface of support 10 against which they are permanently clamped by action of band 14. As charge holder 20 is adapted to be disposed of upon completion of a single brewing operation, I have found that no additional reinforcing means need be provided to support filter sheet 12. Charge 17 thus is effectively retained in space 13 which is bounded by plate 11 and filter 12 during the brewing operation, and any weakening of the filter material due to the wetting thereof occurs sufficiently subsequent to the brewing operation to allow the proper one-time use of the charge holder.

Band 14 may be formed of a material similar to that of support 10 and has a complementary or co-acting configuration relative to support 10 causing it to fit snugly around the support and thereby clamp permanently the filter sheet 12 to the support. In the illustration, band 14 has a frusto-conical shape with the internal diameter thereof substantially equal to the external diameter of support 10. Band 14 is preferably formed with a substantial surface area in juxtaposition to the outer surface of support 10 to allow distributed and low pressure retaining action on filter sheet 12. This effectively minimizes undesirable tearing of the sheet and permits the use of a relatively thin and inexpensive band material.

Tabs 15 may be formed integrally with the band such as by cutting them therein. In normal usage it is expected that the tabs will be retained generally circumferentially until utilization of the holder at which time they may be pried or positioned to extend generally laterally outwardly and to form support means for retaining holder 20 on receptacle 16.

In use, beverage charge holder 20 is positioned by any suitable means above a receptacle 16. It may be retained in this position by utilization of the tabs 15 if desired. A suitable liquid, which is determined by the specific beverage to be brewed and the nature of the charge, is then directed onto the upper surface of plate 11 with the upper portion of support 10 acting to guide the liquid onto the plate. This liquid then passes through the openings 11a into space 13 containing the charge 17 where the beverage preparation is effected. As flange 11b is permanently, sealing secured to support 10 (thereby preventing by-passing of liquid between the flange and the support) all the liquid passes through the charge. The brewed beverage passes from space 13, through filter 12, and downwardly into receptacle 16. Filter 12 acts to prevent the passage of any undesirable solid material into the receptacle. When the proper quantity of beverage has been prepared (the quantity of which charge 17 is capable of producing), the entire charge holder 20 together with the spent charge is disposed of as desired, in the same manner as a tea bag.

In Figure 3 is shown a modified form of charge holder 30 wherein an enclosure 112 comprising a pair of sheets 112a and 112b is provided for retaining the beverage charge 117. The peripheral edges 112a' and 112b' of the sheets are disposed outwardly of the support 110 and clamped thereagainst by a band 114 in a manner similar to the clamping of edge 12a by band 14 in the embodiment of Figures 1 and 2. If desired, edges 112a' and 112b' may be secured together prior to the assembly in the charge holder to form a bag for retaining the charge. Such construction permits use of a charge comprising extremely fine particulate material which otherwise would pass outwardly through the filter plate apertures 111a. It further allows more simplified assembly of the beverage charge holder as it effectively eliminates the possibility of loss of charge material during the assembly operation. Except that a double filtering occurs, namely, a filtering of the liquid before it passes through the charge 117 and a filtering of the brewed beverage as it leaves the charge, the function of this form of the invention is similar in all respects to that of the first described form.

In Figure 4 is shown a beverage charge holder 40 having a support 110' which is elongated axially a sufficient distance to allow a volume of liquid to be retained above plate 11 which is comparable to the volume of the receptacle 16. In this form the entire volume of liquid may be placed in the charge holder support at one time and allowed to pass as desired through the charge. Tabs 115 similar to tabs 15 may be provided for supporting the charge holder on the receptacle. The functioning of charge holder 40 is similar in all other respects to the functioning of charge holder 20.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A disposable charge holder comprising: a cup-shaped member having a foraminous transverse portion and a depending annular flange defining a charge holding space; a sheet of filter material having a filter portion extending across the bottom of said space and a securing portion extending laterally thereof; a charge in said space; an annular support member secured sealingly to the flange; and an outer concentric annular band, said securing portion of the filter sheet being clamped between said support member and said band to secure the filter sheet to said support member, and thus, to said flange, said flange, support member and band having a complementary downwardly narrowing taper, and said support member extending upwardly from the plane of the transverse portion of the cup member to define a liquid holding space.

2. A disposable charge holder comprising: a cup-shaped member having a foraminous transverse portion and a depending peripheral flange defining a charge holding space, said flange being frusto-conical narrowing downwardly; a sheet of filter material having a filter portion extending across the bottom of said space and a securing portion extending laterally thereof; a charge in said space; and frusto-conical means including an inner support member and a concentric outer band clamping said securing portion sealingly to said flange, said support member having a minimum inner diameter substantially equal to the minimum outer diameter of the flange at the bottom of said space.

3. A disposable charge holder comprising: a cup-shaped member having a foraminous transverse portion and a depending peripheral flange defining a charge holding space; a first sheet of filter material having a filter portion extending across the bottom of said space and a securing portion of the first sheet extending laterally thereof; a second sheet of filter material having a filter portion facially juxtaposed to the underside of the transverse portion of said cup-shaped member, a portion of the second sheet depending in facial juxtaposition to the inner face of said flange, and a securing portion of the second sheet extending laterally thereof; a charge in said space between said first and second sheets of filter material; an annular support member secured sealingly to the flange; and an outer, concentric annular band clamping both of said securing portions sealingly to said support member and, thus, to the flange, said flange, support member and band having a complementary downwardly narrowing taper, and said support member extending upwardly from the plane of the transverse portion of the cup member to define a liquid holding space.

References Cited in the file of this patent

UNITED STATES PATENTS

| 1,456,010 | Richheimer | May 22, 1923 |
| 1,876,474 | Starkey | Sept. 6, 1932 |
| 2,084,839 | Dubois | June 22, 1937 |
| 2,743,664 | Dale | May 1, 1956 |

FOREIGN PATENTS

| 812,235 | France | Feb. 1, 1936 |
| 902,986 | France | Jan. 5, 1945 |
| 660,983 | Germany | Sept. 6, 1935 |